(12) United States Patent
Lochan Dass et al.

(10) Patent No.: US 12,456,121 B2
(45) Date of Patent: Oct. 28, 2025

(54) FINGERPRINT RECOGNITION FOR POINT OF SALES TERMINAL SYSTEM

(71) Applicants: Veda Lisa Lochan Dass, Thornhill (CA); Neal Dass, Thornhill (CA)

(72) Inventors: Veda Lisa Lochan Dass, Thornhill (CA); Neal Dass, Thornhill (CA)

( * ) Notice: Subject to any disclaimer, the term of this patent is extended or adjusted under 35 U.S.C. 154(b) by 741 days.

(21) Appl. No.: 15/964,902

(22) Filed: Apr. 27, 2018

(65) Prior Publication Data

US 2019/0333070 A1     Oct. 31, 2019

(51) Int. Cl.
| | | |
|---|---|---|
| G06Q 20/40 | (2012.01) | |
| G06Q 20/20 | (2012.01) | |
| G06Q 20/34 | (2012.01) | |
| G06Q 20/38 | (2012.01) | |

(52) U.S. Cl.
CPC ....... *G06Q 20/40145* (2013.01); *G06Q 20/20* (2013.01); *G06Q 20/34* (2013.01); *G06Q 20/3829* (2013.01)

(58) Field of Classification Search
CPC .............................................. G06Q 20/40145
See application file for complete search history.

(56) References Cited

U.S. PATENT DOCUMENTS

| | | | |
|---|---|---|---|
| 5,712,912 A | 1/1998 | Tomko et al. | |
| 5,832,091 A | 11/1998 | Tomko et al. | |
| 6,011,858 A * | 1/2000 | Stock ................... | G06Q 20/341 382/115 |
| 6,270,011 B1 | 8/2001 | Gottfried | |
| 6,498,861 B1 * | 12/2002 | Hamid ..................... | G07C 9/37 340/5.52 |
| 6,886,741 B1 | 5/2005 | Salverson | |
| 7,778,935 B2 | 8/2010 | Colella | |
| 7,844,550 B2 | 11/2010 | Walker et al. | |
| 8,345,939 B2 | 1/2013 | Kountotsis | |
| 8,417,960 B2 | 4/2013 | Takahashi et al. | |
| 8,606,700 B2 | 12/2013 | Carlson et al. | |
| 9,083,486 B2 | 7/2015 | Lyne et al. | |
| 9,235,698 B2 | 1/2016 | Webber et al. | |

(Continued)

FOREIGN PATENT DOCUMENTS

| | | |
|---|---|---|
| CA | 2650662 | 11/2007 |
| CN | 104408615 | 3/2015 |

(Continued)

OTHER PUBLICATIONS www.fileformat.info, Pros and Cons of Bitmap File Formats (p. 1) (Year: 2017).*

(Continued)

*Primary Examiner* — Jay Huang
(74) *Attorney, Agent, or Firm* — Gowling WLG (Canada) LLP; Denis Keseris

(57) ABSTRACT

A method of use and a fingerprint recognition for a Point of Sale (POS) terminal system; the POS terminal system may be used as a secure means to purchase items. The POS terminal system includes a database configured to store personal information associated with an individual user. The personal information may be accessed by inputting biometric data and an alphanumeric code at a POS terminal. The invention also provides a secure means of encrypting and decrypting data files with the user's fingerprint.

12 Claims, 7 Drawing Sheets

(56) References Cited

U.S. PATENT DOCUMENTS

| | | | |
|---|---|---|---|
| 9,374,370 B1* | 6/2016 | Bent, II | H04L 63/061 |
| 2001/0036297 A1* | 11/2001 | Ikegami | G06V 40/28 |
| | | | 340/5.52 |
| 2002/0018585 A1 | 2/2002 | Kim | |
| 2003/0056108 A1* | 3/2003 | Mont | G06F 21/6245 |
| | | | 713/193 |
| 2004/0064453 A1* | 4/2004 | Ruiz | G07C 9/257 |
| | | | 707/999.009 |
| 2004/0248555 A1* | 12/2004 | Herrmann | G07F 17/3241 |
| | | | 455/411 |
| 2005/0029349 A1 | 2/2005 | McGregor et al. | |
| 2006/0089909 A1 | 4/2006 | McLeod et al. | |
| 2008/0201769 A1* | 8/2008 | Finn | G06Q 20/4014 |
| | | | 707/999.01 |
| 2013/0232075 A1* | 9/2013 | Monaghan | G06Q 20/403 |
| | | | 705/44 |
| 2014/0122267 A1 | 5/2014 | Tayebi | |
| 2014/0222596 A1 | 8/2014 | Prakash | |
| 2015/0046328 A1 | 2/2015 | Mitra | |
| 2016/0012433 A1* | 1/2016 | Marenick | G06Q 20/3823 |
| | | | 705/72 |
| 2016/0078245 A1* | 3/2016 | Amarendran | G06F 21/6218 |
| | | | 713/193 |
| 2016/0277396 A1* | 9/2016 | Gardiner | H04L 63/0861 |
| 2016/0323274 A1* | 11/2016 | Chandrasekaran | G06F 21/32 |
| 2016/0352520 A1* | 12/2016 | Schwach | G09C 5/00 |
| 2017/0091774 A1* | 3/2017 | White | G06Q 20/3227 |
| 2017/0109742 A1* | 4/2017 | Varadarajan | H04L 63/0861 |
| 2017/0116602 A1* | 4/2017 | Chauhan | G06Q 20/40145 |
| 2017/0293906 A1* | 10/2017 | Komarov | H04L 63/1416 |
| 2018/0225669 A1* | 8/2018 | Choi | G06K 9/00087 |
| 2018/0308101 A1* | 10/2018 | Valencia | G06F 21/32 |
| 2019/0190704 A1* | 6/2019 | Srivastava | H04L 63/067 |
| 2020/0184481 A1* | 6/2020 | Kankaria | G06Q 20/322 |
| 2021/0288797 A1* | 9/2021 | Zhang | H04L 9/0618 |

FOREIGN PATENT DOCUMENTS

| | | |
|---|---|---|
| CN | 204667466 | 9/2015 |
| WO | 99/52060 | 10/1999 |
| WO | 2000055800 | 9/2000 |

OTHER PUBLICATIONS

International Search Report of PCT/CA2019/050432.
English Translation of CN104408615.
English Translation of CN204667466.

* cited by examiner

FINGERPRINT RECOGNITION FOR POINT OF SALES TERMINAL SYSTEM

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

1. Field of the Invention

The present invention relates generally to the field of electronics and payment methods and more specifically relates to a secure Point of Sale ("POS") transaction using fingerprint pattern recognition, to provide a secure method to encrypt and decrypt data files.

2. Description of Related Art

Today, typically people have to carry cash or debit/credit cards to stores or other vendors in order to pay for purchased goods or services. These payment systems and methods based on on-hand cash, debit or credit card, expose people to the risk of theft and loss of such valuable items including wallets, purses, etc. In addition, debit and credit card numbers are targets of online fraudulent activity daily. Thus, there is a need for more convenient (cashless and cardless), safe and secure (fingerprint based) methods and systems for making payments, without the need to carry a wallet, purse or billfold.

U.S. Pub. No. 2015/0046328 to Manu Mitra relates to a secured point of sale transaction using fingerprint recognition. The described secured point of sale transaction using fingerprint recognition includes a method for operating a computerized system for processing cashless and cardless financial transactions, the method comprising the steps of: registering a user's fingerprint with an entity, by using the user's fingerprint to create a first image of the user's fingerprint and then storing the first image of the user's fingerprint in a digital database of the entity; associating the first image of the user's fingerprint, now registered, with at least one debit or credit account of the user; receiving, through a transaction device, a request to authorize a financial transaction, wherein said request comprises a second image of the user's fingerprint taken by the transaction device at the time the request to authorize the financial transaction is made; and, authenticating the request to authorize the financial transaction, by comparing in real time, through a computer network, the second image with the first image of the user's fingerprint.

BRIEF SUMMARY OF THE INVENTION

In view of the foregoing disadvantages inherent in the known electronics and payment methods art, the present disclosure provides a novel fingerprint encryption process primarily for use in a Point of Sale (POS) terminal system, or other fingerprint authenticated applications. The general purpose of the present disclosure, which will be described subsequently in greater detail, is to provide a secure method of purchasing items with a unique encryption and decryption system. This unique encryption and decryption method can also be used to store and retrieve a variety of data files in a highly secure environment, accessible only by the user's fingerprint.

A method to encrypt and decrypt a file containing data in accordance with a pattern extracted from a digital representation of a fingerprint is also disclosed herein. This method of using fingerprint encryption for POS terminal systems may comprise the steps of: providing the fingerprint recognition for a POS terminal system, comprising a POS terminal hosting an application and in communication with a server via a communication network; and a database configured to store encrypted personal information associated with an individual user. The personal information associated with the individual user within the database is accessible by entering the alphanumeric code or cellphone number of the user via the POS terminal which sends the personal information from the server's database to the POS terminal; the terminal is configured to extract data from the fingerprint in the form of a Personalized Data Key; decrypting the personal information utilizing the Personalized Data Key; displaying personal information on the POS display. Registering a profile associated with the individual user initially and inputting the personal information associated with the individual user to be used for payment transactions; encrypting said personal information utilizing the Personalized Data Key and saving said personal information as a data file linked with the user's alphanumeric code or cellphone number and stored on a server's database. The method further includes converting the fingerprint scan to a bit-map and proprietary-software stored on the POS terminal or server uses this bit-map to generate a Personalized Data Key associated with each fingerprint scan; updating the personal information when desired at the POS terminal; and encrypting and saving this personal information as a new data file on a server utilizing the Personalized Data Key. Any parts of the digital representation (or bit-map) of said fingerprint are not stored at any location. Encryption and decryption are specific to a single digital representation of a fingerprint or group of fingerprints.

Enhanced versions may enable the terminal to automatically send electronically a receipt or confirmation of each transaction processed with a fingerprint, in accordance with the present invention as described herein. The user would be required to enter their email address and or cellphone number as part of their profile when the data file is first set up at the terminal, or it can be edited at a later stage. The option to have a receipt or confirmation (redacted or otherwise) of each terminal transaction utilizing the user's Personalized Data Key(s) sent to the user by email or SMS, may be prompted at the terminal display for the user to accept or decline. Further profile settings may be selected at the terminal to send periodically an accumulation of such transactions processed with the user's fingerprint, to track and verify usage.

Enhanced versions may replace the server with a memory card to be inserted at the POS terminal to store and retrieve data. Essentially, the memory card is an encrypted device containing all the user's cards and the option of storing associated PINs in which only the user's finger can decrypt this data. This would eliminate the need for bulky cards in a wallet or purse and the user is in full control of security. Enhanced versions may have the data file encrypted differently each time it is retrieved from the server or memory card by utilizing a random number generator or other methods for higher levels of security. Enhanced versions may have multiple fingers scanned to backup and retrieve data in the event one finger is damaged. Enhanced versions may have multiple fingers scanned to access any data file for a higher level of security whereby multiple Personalized Data Keys are used in the encryption Enhanced versions may also have the option to display photo ID such as Driver's License and Health Cards when purchasing age restricted products such as Tobacco, Alcohol and Cannabis. Green and Red flashing borders around photo ID would greatly assist the store Clerk in approving the Customer where the Red flashing border indicates the Customer is not of age or otherwise prohibited from purchasing certain items. Automatic ID verification may be enabled as an added feature for FastTrack checkout. Photo imprints (or coded imprints) on a redacted receipt would indicate that the Customer's age has been verified at the time of the transaction. A database can record or track sales or purchases of sensitive items from information processed at such point of sale terminals. Authentic photo IDs can be obtained from authorities for a fee and added to customer's profile (this would avoid photoshop versions of IDs appearing on point of sale terminals).

Since multiple fingers can be used to store and retrieve the same data in the event one finger is damaged, it is possible for multiple users to access the same cards if individual photo identification is not required. The invention can also be applied to Automotive applications whereby the fingerprint is used to allow only registered drivers access to the vehicle controls, with the owner electronically notified as to which driver has started the vehicle etc. The invention can similarly be applied to home/office door entry or alarm systems. The invention can be applied to voting or data collection where it is important to track each user's activity. The invention can also be applied to remote fingerprint access desktops, whereby the user's desktop and data files can be retrieved at any Internet Café terminal by entering the alphanumeric code or cellphone number, and scanning the associated fingerprint to decrypt and display all saved information from the database.

This concept can also be applied to offering users the chance to store other types of data they wish to back up in an encrypted manner whereby only the user's fingerprint can decrypt and access such information from a cloud drive or any data storage facility. There can be a pre-authorized option for example. If a user enters an establishment like a restaurant or bar and scans fingerprint, the user can select a card credit card or debit card and pre-authorize a certain amount of money they wish to spend. There's an electronic tab created for the user and the user's fingerprint can be used for each purchase and a balance shown to the user upon making each purchase. Thus, the user has a method to control spending and the establishment can also do a block pre-authorization, so they are assured of payment on a credit card. Increasing spending limits, time stamped itemized invoice, SMS or emailed transactions in real time, invoices, etc. can be all made available. Potential uses are not limited to payment transactions at POS terminals but include public transit, public phones, libraries, resorts, cruise ships, internet cafes, vaults, military weapons, ambulances, hospitals, clinics, airport security, boarding passes. Multiple fingers may be scanned so an alphanumeric code first entered at the point of sale terminal sends multiple batch files to the terminal. If one fingerprint damaged, then another can be used and its corresponding batch file opened and all cards displayed to the user. Terminals are not limited to POS but include Laptops, Tablets, Electronic Devices containing a processor, Servers, ATMs. Biometric scans are not limited to fingerprint(s) but include palm scans and retinal scans.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a fingerprint recognition for POS terminal system, constructed and operative according to the teachings of the present disclosure.

The various embodiments of the present invention will hereinafter be described in conjunction with the appended drawings, wherein like designations denote like elements.

DETAILED DESCRIPTION

Figure 1:
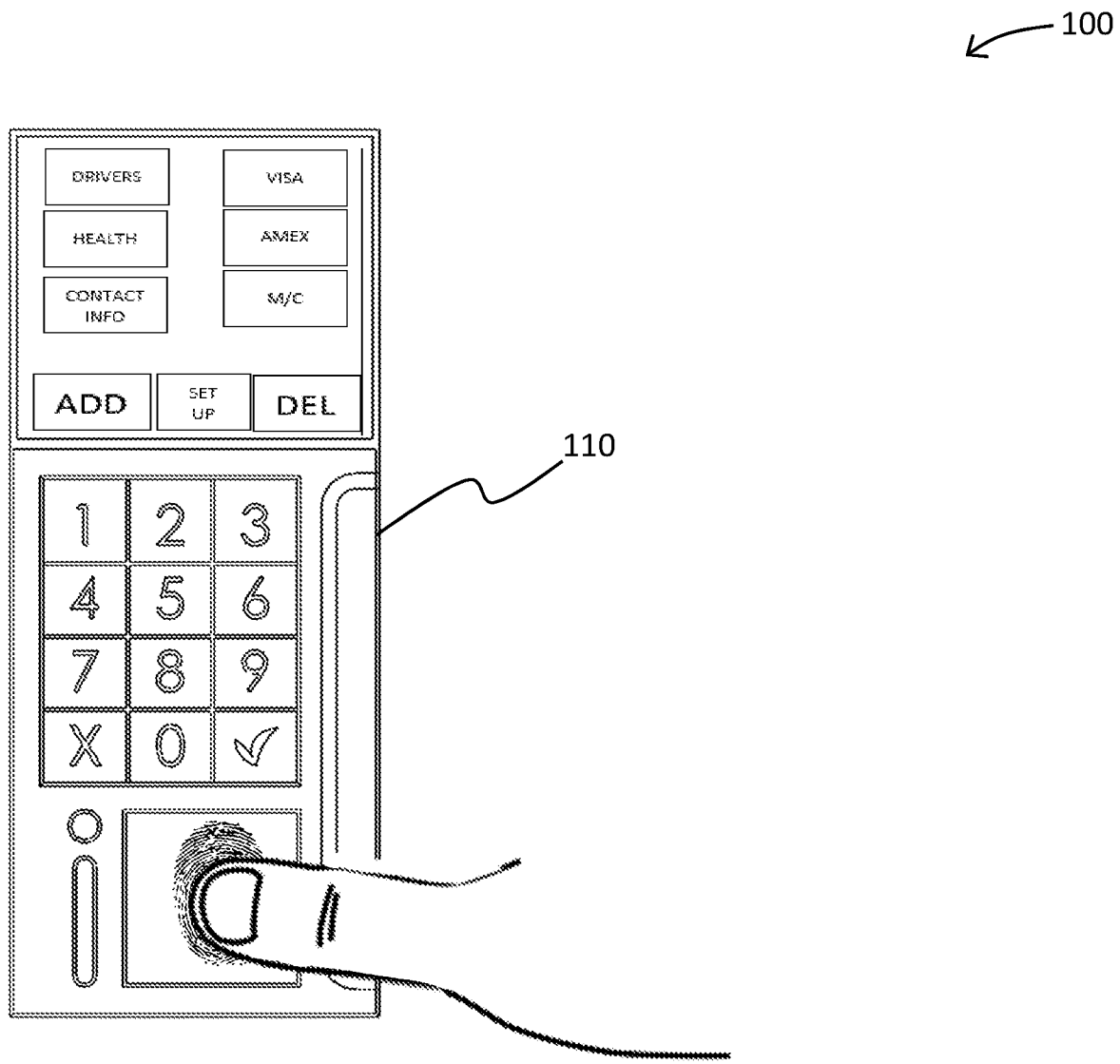
FIG. 1 is a perspective view of the fingerprint recognition for POS terminal system according to an embodiment of the disclosure.

As discussed above, embodiments of the present disclosure relate to electronics and payment methods and more particularly to a fingerprint recognition for a Point of Sale (POS) terminal system as used to improve security of purchase transactions using fingerprint encryption, and also a secure method to encrypt and decrypt a variety of data files.

Generally, the present invention provides an extremely high level of security for processing payment transactions via credit cards or debit cards at a POS terminal. Each fingerprint scanned on a POS terminal may be converted to a bit-map and proprietary software residing on the POS or a back-end server can extract data using selected parts or all of the bit-map to generate a Personalized Data Key. This Personalized Data Key, which is unique to each individual's fingerprint, is then inserted into an encryption module (application software and/or algorithms) to decrypt credit card or debit card information and also photo identification such as a driver's license and health card which is then presented to a user for use on the POS terminal display screen. Likewise, this Personalized Data Key unique to each user, is also used to encrypt a new card at the POS terminal if the user wishes to add another card to their data file, which is then saved and sent to the storage location or server over a communication network. The Personalized Data Key is securely removed and deleted from the POS terminal or server immediately upon completion of any transaction.

Each user may have their own encryption/decryption corresponding to their fingerprint. The present invention does not compare the fingerprint with anything as conventional authentication methods. More importantly, the present invention does not store the user's fingerprint scan or any parts of it at any location, which is a significant security advantage. The fingerprint scan is used to generate a unique Personalized Data Key for each user which can be consistently and accurately replicated by one or more algorithm or application software. This Personalized Data Key is implemented as a function of the encryption/decryption application software. Thus, the encryption software is different for each user since it is a function of their fingerprint. Since fingerprints are not alike, then Personalized Data keys and corresponding encryption would also vary accordingly with each fingerprint. The Personalized Data Key is used to encrypt and decrypt data at the POS terminal or the POS back end servers. For a higher level of security, the algorithms or application software used to encrypt and decrypt data files may be altered such that each time a data file is decrypted, another (different) algorithm or application software version is used to encrypt and save this file after the user has completed the transaction at the POS. The POS would be given secure instructions as to which algorithm or application software version was last used to encrypt the data file to facilitate decrypting. The encryption model can be enhanced to never use the same encryption twice whereby the data file is encrypted in a different manner after each time it is used at the POS terminal.

The present invention for a POS terminal system may store encrypted data on the POS back end server (of credit cards and other personal information) to be retrieved and displayed at POS terminals, but does not use fingerprint authentication by any comparison methods. The user enters an alphanumeric code or a cell phone number or email address on the POS terminal and the POS back end server sends an encrypted batch file or data file to the POS terminal associated with the user. The Personalized Data Key generated from the scan of the user's fingerprint in conjunction with encryption software residing on the POS terminal or back end server decrypts this data file and presents all cards and photo IDs to the user at the POS terminal display screen to proceed with payment. Multiple cards can be added at the POS terminal and also deleted as the user desires. If a card is added to the user's personal information (or deleted), the data file is saved and encrypted and stored at the server's database replacing the old data file associated with the user's alphanumeric code or cellphone number. Likewise, multiple fingers can be used in a similar manner to have alternate means to retrieve the user's personal information in the event a fingerprint is damaged. The proprietary software used in conjunction with the Personalized Data Key can be updated or altered periodically to enhance security, rendering any illegally obtained data files useless. The Personalized Data Key and fingerprint scan or bitmap are never stored at the POS terminal or server, but these are securely shredded, overwritten or deleted promptly to enhance user security.

In another embodiment, the fingerprint recognition for a POS terminal system also stores all encrypted credit card, debit card, driver's license, health cards and other forms of identification on a miniature memory card which can be attached to a keychain or other items. The stored data can only be decrypted with the Personalized Data Key obtained from the user's fingerprint as previously described. The user may insert the memory card into the POS terminal memory card reader and place a specific finger on the fingerprint scanner, which is embedded or attached to the POS terminal, then all cards and photo IDs stored on the memory card become available on the POS screen for the user to select upon decrypting. This specific finger used in the decryption process is the same one previously used to encrypt the data file. The user still has to enter the PIN associated with each card for a higher level of security if desired, or optionally use the fingerprint data to gain direct access to payment without entering the PIN associated with the payment card, which is a faster but less secure method whereby the PIN may be stored in the user's personal information. This effectively replaces the need for a wallet and the user would have the comfort in knowing that their card details are not stored on a server but with them at all times in a more secure encrypted environment. Photos and or photo I.D. cards of a user may be included for identification confirmation by a store clerk to verify and proceed with a transaction and payment.

In another embodiment of the invention, whereby for a higher level of security two fingers (or more) may be used in generating two different security keys (or more) to be used in the same encryption module. This is more complex and adds a higher level of security for encryption and decryption. In the instance where the user wishes to save changes to their personal information on the data file, multiple fingers are scanned each producing a corresponding Personalized Data Key which are subsequently used in the encryption module to encrypt the user's data file stored on a server's database. When the user retrieves the data file at a POS terminal by entering the corresponding alphanumeric code or cellphone number, the same multiple fingers must be scanned to produce Personalized Data Keys used in decrypting the data file and displaying all personal information on the POS terminal display.

In another embodiment of the invention, each time the data file is retrieved at the point of sale terminal or other type of terminal, it is deleted (or shredded or overwritten) from its storage location (at server or memory card) and replaced by a different newly encrypted data file generated at the terminal containing the same personal information of the user. In conjunction with fingerprint scans producing Personalized Data Keys, a random number generator may be utilized to insert a different number each time the user's data file is accessed together with the Personalized Data Key(s) to be used in the encryption module when encrypting and saving the data file. Implementation of this random number after each time the data file is accessed would ensure that the data file would be different each time the user is finished at the point of sale terminal even if no changes were made to the user's profile (no cards added or deleted or edited in any way at the terminal). The terminal would have the means of knowing what this random number is at the time of retrieving the data file from the storage location to enable successful decryption with the fingerprint scan at the terminal. Certain markers or code may be implemented in the data file to enable the encryption module to determine what random number was last used in encrypting. Thus, the data files associated with each user is encrypted differently after each time it is accessed since the encryption formula changes, even though the fingerprint and Personalized Data Keys remain constant.

In one embodiment of the invention, the encryption module or application software can perform the encryption on the data file retrieved from the server or memory card but parts of the user's card details would still be missing (or other parts of the data file would be missing making the file incomplete), rendering the personal information of the user incomplete. Thus, the Personalized Data Key containing this critical information is used to fill in the missing information when applied to the encryption module, and this completes the data file to enable and complete a transaction at the terminal. Information (or code) may be added to the user's data file to aid the decryption process, acting as guides to the insertion and application of the Personalized Data Key into the encryption module, to enable successful decryption of the data file for display to the user.

In another embodiment of the invention, the encryption module would be unable to perform its task as key elements in its functionality would be missing and can only be supplied by the Personalized Data Key. Thus, different users would have different encryptions and the encryption module can only be made fully functional with the missing pieces provided by the user's Personalized Data Key. In such a scenario, the data file would remain encrypted and nothing displayed on the POS terminal until the encryption module is made fully functional by insertion of the proper Personalized Data Key obtained from fingerprint scan(s) of the user.

In a further embodiment of the invention, in instances where a higher level of security is required, a combination of the above two previously mentioned embodiments may be implemented whereby parts of the Personalized Data Key(s) are used to complement the encryption module enabling its functionality, and at another stage part of the Personalized Data Key contains critical information is used to fill in the missing information to complete the data file to enable a transaction at the terminal, thus making this a hybrid version of the invention. In all methods of encryption for the present invention, the decryption process would have essentially the opposite or reverse algorithmic steps of encryption, to facilitate complete decoding of the encrypted file into its original state before the encryption process at the POS terminal.

In all embodiments of the invention, conventional methods of encryption/decryption may be added to the data file in conjunction with present methods of encryption/decryption disclosed herein, offering an extra layer of secure encryption protection to the user.

Whereby for a higher level of security two fingers (or more) may be used in generating two different Personalized Data Keys (or more) to be used in the same encryption module. This is more complex and adds a higher level of security for encryption and decryption.

In another embodiment of the invention, the database is located at the POS terminal in a memory device embedded in the terminal or connected wired or wirelessly to the terminal. This enhances speeds of accessing data files in a mobile environment and also provides a more secure restricted environment for data storage and retrieval, with periodic updating of the database when convenient or necessary.

Referring now more specifically to the drawings by numerals of reference, there is shown in FIG. 1, a view of a fingerprint recognition for POS terminal system 100. FIG. 1 shows a fingerprint recognition for POS terminal system 100, according to an embodiment of the present disclosure. The fingerprint recognition for POS terminal system 100 may be used for secure transactions. A customer may select items to purchase and a clerk then scans and presents a bill to the customer. The customer may then request to pay by fingerprint. The clerk enters the bill amount on a POS terminal 110 and allows the customer to enter an alphanumeric code or cellphone number to retrieve an encrypted data file associated with the user from a server over a communication network. The customer then scans his or her finger when prompted, which is converted to a bitmap or a digital dot matrix array representing the fingerprint. From the user's fingerprint bitmap, algorithms or application software extract information which in turn generates a Personalized Data Key. This Personalized Data Key is used in encrypting and decrypting the data file of the user. When the retrieved data file is decrypted by implementing the Personalized Data Key, a menu may be provided and displayed to the user with numerous options for payment such as credit cards, debit cards, photo identification and such. The customer then selects a payment method, enters the PIN associated with the payment card (which is optional for higher security) and completes the transaction Enhanced versions may also have an option to display photo identification such as driver's license and health cards when purchasing age restricted products such as tobacco, alcohol and cannabis. Another embodiment of the present invention may also have the PINs stored in the data file for each associated payment card thereby eliminating the need to enter a PIN once a card is selected for payment, as a faster but less secure option available to the user with the ability to enable a spending limit for this option.

Figure 2:
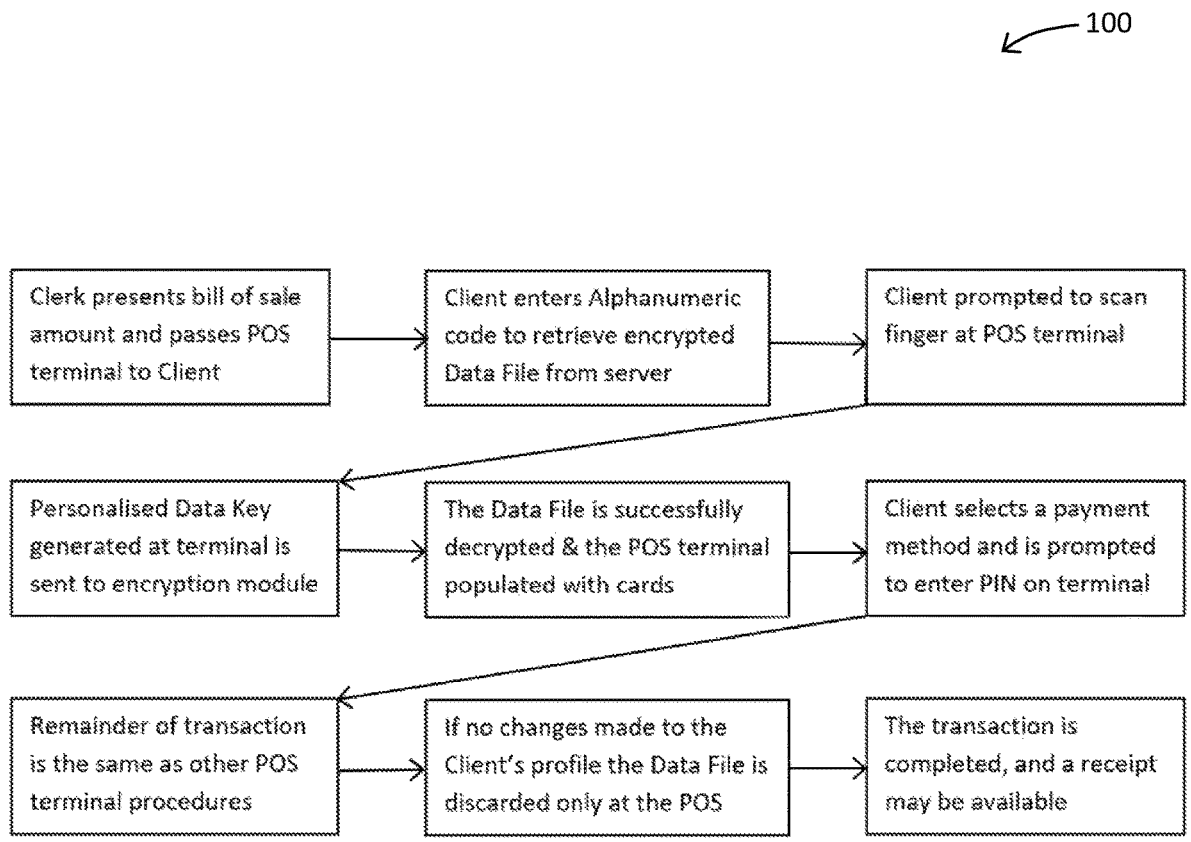
FIG. 2 is a flow chart of the fingerprint recognition for POS terminal system of FIG. 1, according to an embodiment of the present disclosure.

FIG. 2 shows a flow chart of the fingerprint payment process and sequence of events that occur at a POS terminal system 100 of FIG. 1, according to an embodiment of the present disclosure. The present invention replaces a wallet full of cards or a cellphone containing sensitive payment information. Personal information used at a POS terminal may be encrypted and stored as a data file within a database (local or remote) and accessed as needed. The personal information may be accessed when an alphanumeric number or cell phone number associated with the user is inputted into a POS terminal system 100. The biometric data, in particular the bitmap of the fingerprint scan at a POS terminal system 100, is used to generate a Personalized Data Key essential in decrypting the data file to display all personal information on the POS terminal. The personal information of the fingerprint recognition for POS terminal system 100 includes personal-identification and payment card information for payment transactions. In certain embodiments, the fingerprint recognition for POS terminal system 100 may include a memory-card. The memory-card stores encrypted personal information and may be attachable to a keychain, which may be used to process payment transactions at a POS terminal.

Figure 3:
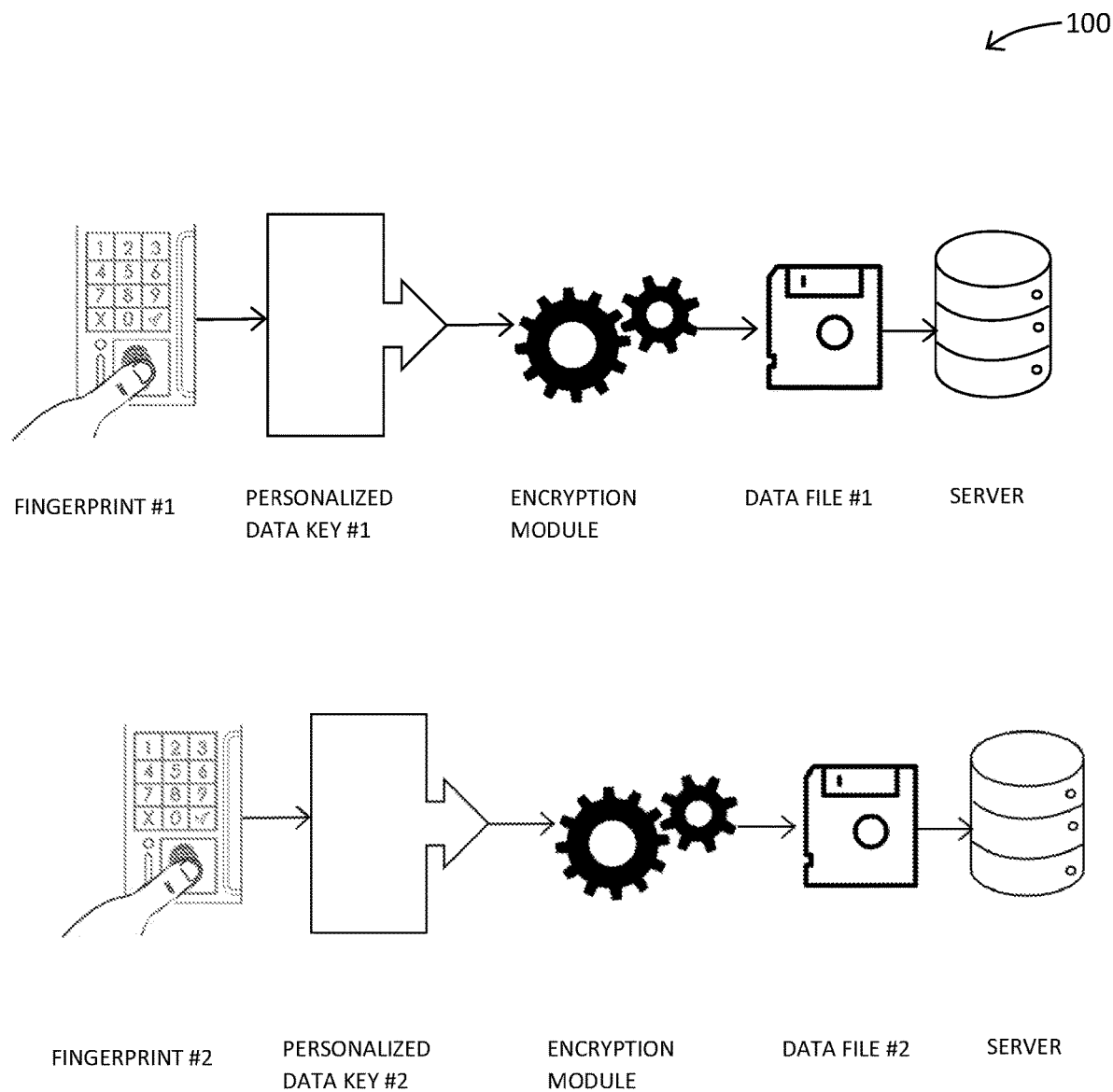
FIG. 3 is a flow diagram of the fingerprint recognition for POS terminal system of FIG. 1, according to an embodiment of the present disclosure.

Referring now to FIG. 3 showing a flow diagram view of the fingerprint encryption process at a POS terminal system 100 of FIG. 1, for different fingerprints according to an embodiment of the present disclosure. As above, the fingerprint recognition for POS terminal system 100 stores encrypted personal information in data files for each user on a server. FIG. 3 displays a process of generating encrypted data files for each user. The personal information is removeable and replaceable from the database on a server over a communication network. The data file may be altered and updated periodically with the user's personal information. The biometric data, in particular the bitmap of the fingerprint scan at a POS terminal system 100, is used to generate a Personalized Data Key essential in decrypting the data file to display all personal information on the POS terminal. FIG. 3 demonstrates different fingerprints each producing their own different data files when encrypted containing the user's personal information, even though the personal information being encrypted and saved may be identical in each data file. Thus, it is possible to encrypt and save the same personal information for any user differently as multiple data files on the same server or data storage facility, whereby each data file may be encrypted or decrypted in accordance with a specific fingerprint. This allows the user the convenience of processing a transaction using a variety of fingers at a terminal.

Figure 4:
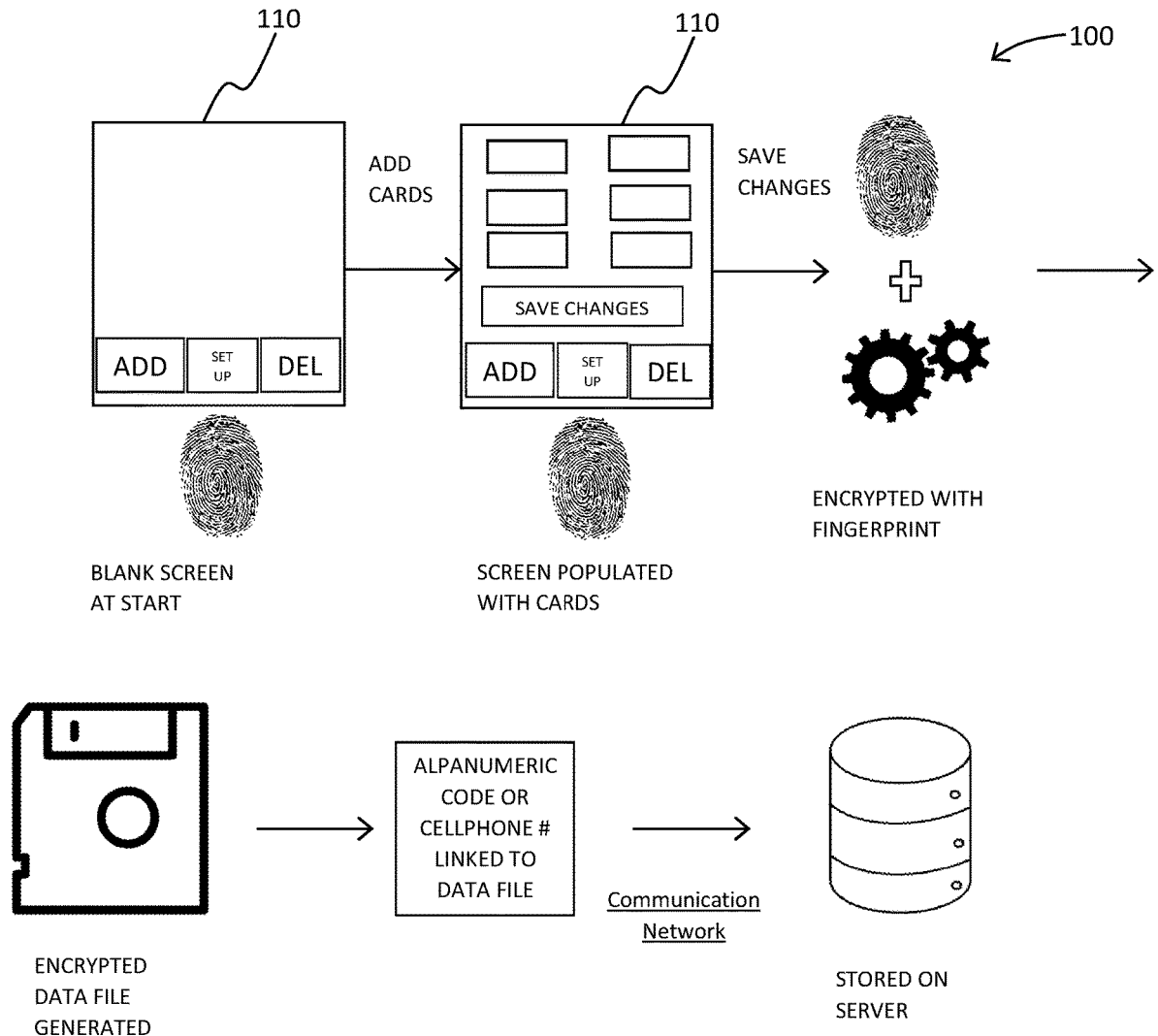
FIG. 4 is a flow diagram of the fingerprint recognition for POS terminal system of FIG. 1, according to an embodiment of the present disclosure.

FIG. 4 shows a flow diagram view of the fingerprint recognition for POS terminal system 100 of FIG. 1, according to an embodiment of the present disclosure. As above, the fingerprint recognition for POS terminal system 100 may provide means to access and display personal information. The POS terminal 110 displays the personal information on a display. The POS terminal 110 of the fingerprint recognition for POS terminal system 100 comprises a fingerprint-scanner to receive the biometric data. The database stores encrypted personal information associated with the individual user such as payment cards, driver's license and health cards on an encrypted data file accessible by input of biometric data or fingerprint scan of the individual user. FIG. 4 shows startup stages in setting up each user at a POS terminal 110 whereby any of the user's cards are added to the user's data file, encrypted with a Personalized Data Key extracted from the user's fingerprint scan, linked to the user's alphanumeric code or cellphone number, and stored as an encrypted data file on a server's database or data storage device locally or remotely over a communication network, for each user. Initially at the POS terminal display, the user would be guided through various menu stages of setting up a profile which includes entering an alphanumeric code or cellphone number, inserting desired payment cards & identification cards, and finally saving the data file. This process links the user's data file with the alphanumeric code or cellphone number so for future reference, the user's data file can be recalled and retrieved at the POS terminal by entering the user's alphanumeric code or cellphone number. In the process of saving the user's data file, more than one fingerprint may be scanned whereby each time a fingerprint is scanned, a different Personalized Data Key is generated and used to encrypt and save a data file on a database for each fingerprint. Thus, any user would have their personal data stored as multiple data files each encrypted differently in accordance with each fingerprint scanned. At any time from the POS terminal, payment cards and other personal information may be added, deleted, or edited.

Figure 5:
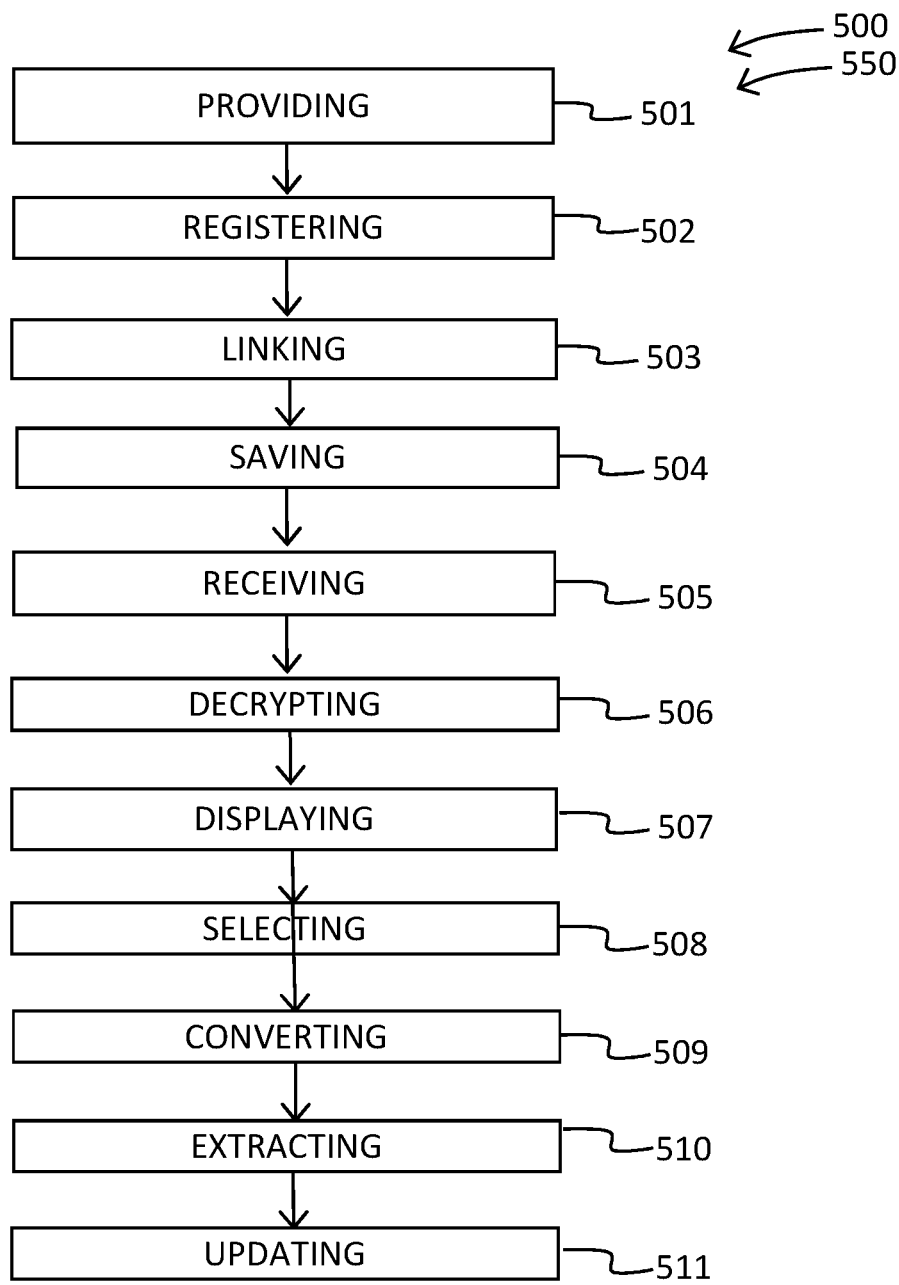
FIG. 5 is a flow chart illustrating a method of use for the fingerprint recognition for POS terminal system, according to an embodiment of the present disclosure.

Referring now to FIG. 5 showing a flow diagram 550 illustrating a method to encrypt and decrypt a file containing data in accordance with a pattern extracted from a digital representation of a fingerprint 500, according to an embodiment of the present disclosure. As illustrated, the method to encrypt and decrypt a file containing data in accordance with a pattern extracted from a digital representation of a fingerprint using a fingerprint recognition for POS terminal system 100 may include the steps of: step one 501, providing the fingerprint recognition for POS terminal system 100, comprising a POS terminal 110 hosting a fingerprint scanner with related software and in communication with a server via a communication network; a database configured to store encrypted personal information and the alphanumeric code or cellphone number associated with an individual user; and a server to store all users information on a database. The personal information or data file associated with the individual user is stored on a database and is retrieved at the POS terminal by entering the alphanumeric code or cellphone number of the individual user into the POS terminal 110. The biometric data, in particular the bitmap of the fingerprint scan at a POS terminal system 100, is used by application software to generate a Personalized Data Key essential in decrypting the data file to display all personal information on the POS terminal; step two 502, registering a profile associated with the individual user and inputting the personal information associated with the individual user, stored as a data file on a server's database; step three 503, linking an alphanumeric code or cellphone number to the user's data file to enable retrieval of personal information from the server for each user; step four 504, encrypting and saving a data file for each user on a server over a communication network; step five 505, receiving the user's data file by entering the alphanumeric code or cellphone number on the POS terminal 110 upon initiating a payment transaction; step six 506, scanning the user's fingerprint to generate a Personalized Data Key used by software to decrypt the personal information at the POS terminal or alternately at the server; step seven 507, displaying the personal information on the POS terminal display upon decryption; and step eight 508, selecting the personal information (card) desired to complete the payment transaction on the POS terminal display; step nine 509, converting the fingerprint scan to a bit-map; step ten 510, extracts a Personalized Data Key from the bit-map used in encrypting and decrypting data files (506, 511) using proprietary-software stored on the POS terminal 110 or alternately at the server; and step eleven 511, updating, encrypting, and saving the user's personal information (data file) if any changes are made to the user's profile, by implementing the user's Personalized Data Key in the encryption process.

Figure 6:
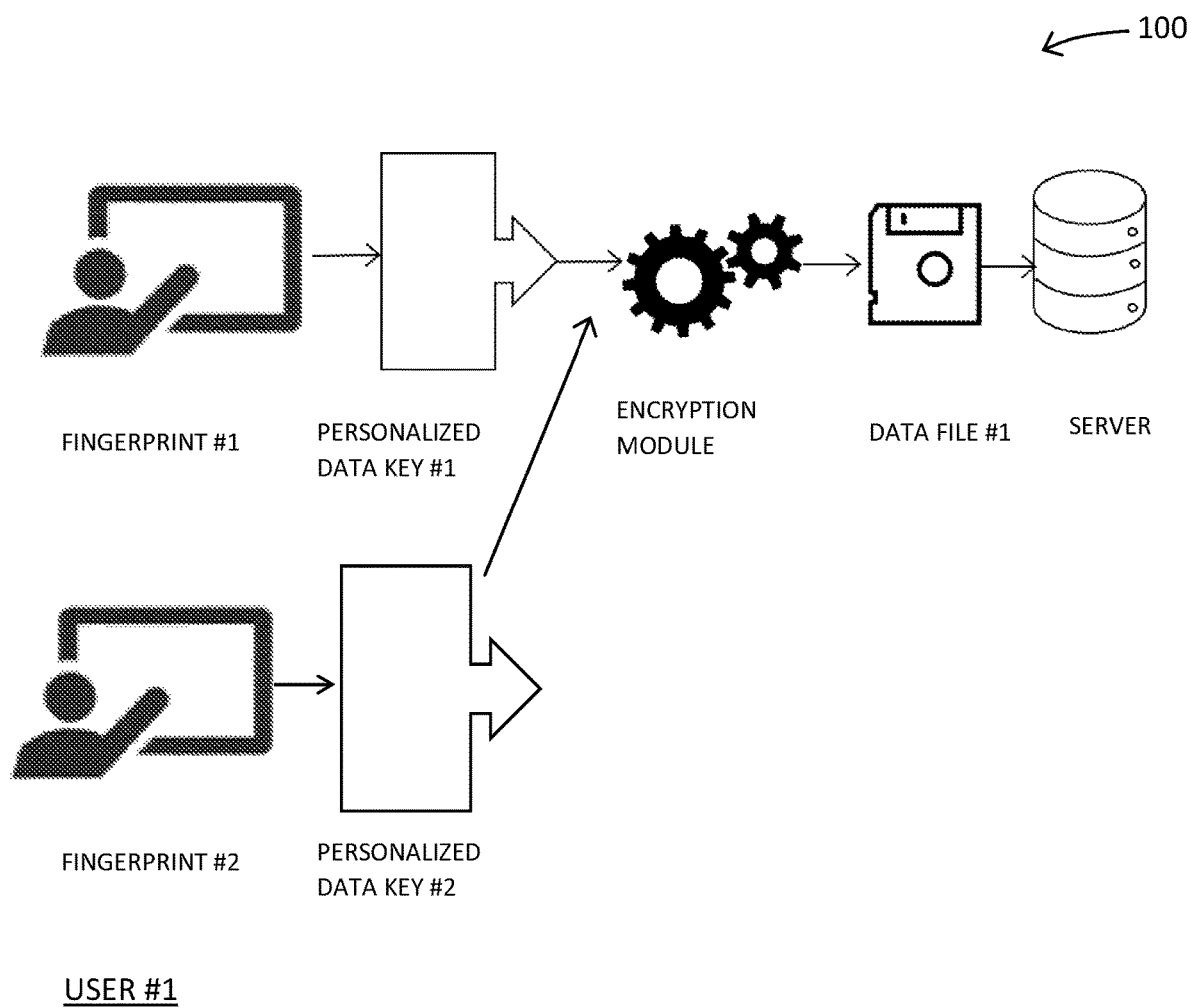
FIG. 6 is a flow diagram of the fingerprint recognition for POS terminal system of FIG. 1, according to an embodiment of the present disclosure.

FIG. 6 illustrates the same user having to scan two fingers to encrypt a single data file, for a higher level of security in accordance with the present disclosure. Application software extracts a Personalized Data Key for each fingerprint and utilizes all Personalized Data Keys in encrypting the data file to be stored on a server's database. The identical fingerprints providing the identical Personalized Data Keys would be required at a later time to decrypt the user's data file to be displayed for use on a POS terminal.

Figure 7:
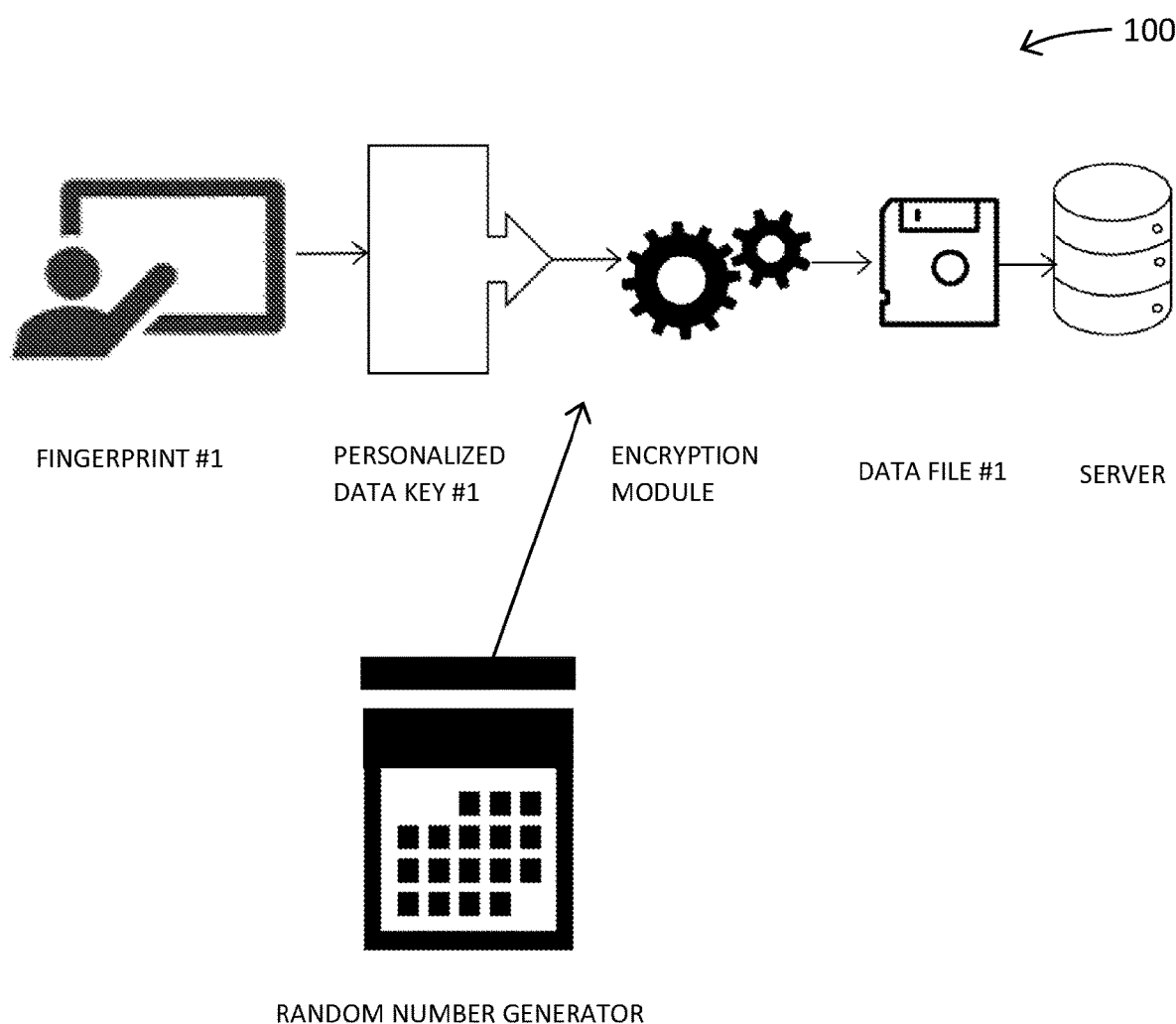
FIG. 7 is a flow diagram of the fingerprint recognition for POS terminal system of FIG. 1, according to an embodiment of the present disclosure.

Referring to FIG. 7, a random number generator is used in conjunction with the Personalized Data Key extracted from a fingerprint scan to encrypt the user's data file. This is particularly useful in maintaining a high level of security in instances where the user's data file is accessed frequently. Each time the data file is used for payment transactions at a POS terminal, it is securely removed from the server and the user's personal information is encrypted and saved differently using the Personalized Data Key and a new number randomly selected to be used as part of the encryption process. This ensures that the data file saved is always differently encrypted from previously saved data files even though the user's personal information may remain unchanged. Thus, the encryption is dynamic and keeps changing each time the user's data file is accessed, offering extremely high security.

It should also be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods to encrypt and decrypt a file containing data in accordance with a pattern extracted from a digital representation of a fingerprint (e.g., different step orders within above-mentioned list, elimination or addition of certain steps, including or excluding certain maintenance steps, etc.), are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A method of accessing a data file using a Point of Sale (POS) terminal device for use in a POS transaction, the method comprising:
    receiving, at the Point of Sale (POS) terminal device, an identifier from a user, the identifier being associated with the user;
    retrieving from a storage device a plurality of copies of a data file containing personal information associated with the user, wherein each one of the plurality of copies is encrypted using a first encryption algorithm or application software, a first random number, and a different unique personalized data key that is generated using one of a plurality of different fingerprint scans of the user, wherein each fingerprint scan is associated with one finger from among a group of fingers of the user;
    obtaining a fingerprint scan of the user from a finger among the group of fingers of the user using a fingerprint scanner in data communication with the Point of Sale (POS) terminal device;
    generating, at the Point of Sale (POS) terminal device, a personalized data key based on the obtained fingerprint scan of the user;
    decrypting one of the plurality of retrieved copies using the first encryption algorithm or application software, the first random number and the generated personalized data key to produce a decrypted data file; and
    selecting one of the data of the decrypted personal information for use in the POS transaction on the Point of Sale (POS) terminal device,
    wherein the first encryption algorithm or application software and the first random number are different from an encryption algorithm or application software and a random number, respectively. used in a previous transaction.

2. The method of claim 1, wherein the personal information comprises payment data, identification data or a combination of payment data and identification data.

3. The method of claim 2, further comprising sending an electronic receipt of the transaction to an email address or a cellphone number associated with the user.

4. The method of claim 1, further comprising:
    modifying the decrypted data file by updating part of the personal information using the Point of Sale (POS) terminal device;
    obtaining a plurality of fingerprint scans of the user from a fingerprint scanner in data communication with the Point of Sale (POS) terminal device;
    generating, at the Point of Sale (POS) terminal device, a plurality of further personalized data keys based on the obtained plurality of fingerprint scans of the user;
    for each of the plurality of generated further personalized data keys, generating an encrypted data file by encrypting a copy of the modified decrypted data file using a second encryption algorithm or application software, a second random number and the respective generated further personalized data key, wherein the second encryption algorithm or application software and second random number are different from the first encryption algorithm or application software and first random number. respectively; and
    sending the plurality of encrypted data files to the storage device.

5. The method of claim 1, wherein said plurality of fingerprint scans are not stored on the Point of Sale (POS) device or the storage device.

6. The method of claim 1, wherein the storage device is a server in data communication with the Point of Sale (POS) terminal device.

7. The method of claim 1, wherein the storage device is a memory device inserted in the Point of Sale (POS) terminal device.

8. The method of claim 1, wherein the fingerprint scanner is embedded in the Point of Sale (POS) terminal device.

9. The method of claim 1, wherein when said plurality of copies of the data file containing personal information are retrieved and decrypted at the Point of Sale (POS) terminal device, said plurality of copies are removed from the storage device and replaced with a plurality of differently encrypted copies of a new altered data file generated on the Point of Sale (POS) terminal device.

10. A Point of Sale (POS) terminal device, comprising:
    a communication module adapted to:
    receive, at the Point of Sale (POS) terminal device, an identifier from a user of the Point of Sale (POS) terminal device for use in a POS transaction, the identifier being associated with the user;
    retrieve from a storage device a plurality of copies of a data file containing personal information, wherein each one of the plurality of copies is encrypted using a first encryption algorithmor application software, a first random number, and a respective unique personalized data key generated based on one of a plurality of different fingerprint scans of the user, wherein each fingerprint scan is associated with one finger from among a group of fingers of the user;
    obtain a fingerprint scan of the user from a finger among the group of fingers of the user using a fingerprint scanner in data communication therewith; and
    a decryption module adapted to:
    generate a personalized data key based on the obtained fingerprint scan of the user; and
    decrypt one of the plurality of retrieved copies using the first encryption algorithm or application software, the first random number and the generated personalized data key to produce a decrypted data file:
    select one of the data of the decrypted personal information for use in the POS transaction on the Point of Sale (POS) terminal device, wherein the first encryption algorithm or application software and the first random number are different from an encryption algorithm or application software and a random number, respectively. used in a previous transaction.

11. The device of claim 10, wherein the fingerprint scanner is embedded in the Point of Sale (POS) terminal device.

12. A system for securely retrieving a data file for use in a POS transaction, comprising:
  a server configured to store a plurality of copies of a data file containing personal information, each of the plurality of copies is encrypted using a first encryption algorithm or application software, a first random number and a respective unique personalized data key generated based on one of the plurality of different fingerprint scans of the user, wherein each fingerprint scan is associated with one finger from among a group of fingers of the user; and
  a Point of Sale (POS) terminal device in data communication with the server, wherein the Point of Sale (POS) terminal device is configured to:
    receive the identifier from the user, the identifier being associated with the user;
    retrieve from the server the plurality of encrypted copies of the data files associated with the identifier;
    obtain a fingerprint scan of the user from a fingerprint scanner in data communication with the Point of Sale (POS) terminal device;
    generate a personalized data key based on the obtained fingerprint scan of the user;
    decrypt one of the plurality of retrieved copies of the encrypted data file using the first encryption algorithm or application software, the first random number and the generated unique personalized data key; and
    select one of the data of the decrypted personal information for use in the POS transaction on the Point of Sale (POS) terminal device,
  wherein the first encryption algorithm or application software and the first random number are different from an encryption algorithm or application software and a random number, respectively. used in a previous transaction.

* * * * *